(12) United States Patent
Golan

(10) Patent No.: US 10,965,632 B2
(45) Date of Patent: *Mar. 30, 2021

(54) MESSAGING SYSTEMS AND METHODS THAT EMPLOY A BLOCKCHAIN TO ENSURE INTEGRITY OF MESSAGE DELIVERY

(71) Applicant: salesforce.com, inc., San Francisco, CA (US)

(72) Inventor: Tal Golan, Newport Beach, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/667,694

(22) Filed: Oct. 29, 2019

(65) Prior Publication Data

US 2020/0084168 A1 Mar. 12, 2020

Related U.S. Application Data

(63) Continuation of application No. 16/049,602, filed on Jul. 30, 2018, now Pat. No. 10,505,877, which is a continuation of application No. 15/207,899, filed on Jul. 12, 2016, now Pat. No. 10,122,661.

(60) Provisional application No. 62/348,733, filed on Jun. 10, 2016.

(51) Int. Cl.
*H04L 12/58* (2006.01)
*H04L 29/08* (2006.01)
*H04L 29/06* (2006.01)
*G06F 16/23* (2019.01)
*G06F 16/901* (2019.01)

(52) U.S. Cl.
CPC .......... *H04L 51/12* (2013.01); *G06F 16/2379* (2019.01); *G06F 16/9024* (2019.01); *H04L 51/04* (2013.01); *H04L 67/1095* (2013.01); *H04L 69/22* (2013.01); *H04L 51/08* (2013.01)

(58) Field of Classification Search
CPC ......... H04L 51/12; H04L 51/04; H04L 51/08; H04L 63/1441; H04L 63/101; H04L 63/102; H04L 67/1095; G06F 17/30377; G06F 17/30958
USPC ........................................................ 709/206
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

*Primary Examiner* — Ruolei Zong
(74) *Attorney, Agent, or Firm* — LKGlobal | Lorenz & Kopf, LLP

(57) ABSTRACT

A messaging system is provided that includes a first message server, a second message server and a distributed database system that stores a blockchain. The first message server receives a message from a first user system, and records at least one selected component of the received message into a block of the blockchain stored in the distributed database system. When the second message server receives the message from the first message server, the second message server can determine whether a component from the received message matches the selected component that is stored in the block of the blockchain.

26 Claims, 9 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,555,523 B1 * | 6/2009 | Hartmann ............... H04L 51/12 709/206 |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 7,912,907 B1 * | 3/2011 | Mantel ................. H04L 51/12 709/206 |
| 7,921,159 B1 * | 4/2011 | Cooley ................. H04L 51/12 709/206 |
| 7,941,490 B1 * | 5/2011 | Cowings ................ H04L 51/12 709/206 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,290,311 B1 * | 10/2012 | Myers ................ G06Q 10/107 382/305 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0246960 A1 * | 9/2010 | Kim ..................... G06F 16/335 382/176 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

(56) References Cited

U.S. PATENT DOCUMENTS

| | | | |
|---|---|---|---|
| 2013/0247216 A1 | 9/2013 | Cinarkaya et al. | |
| 2013/0339456 A1* | 12/2013 | Nikolayev | H04L 51/12 709/206 |
| 2015/0281330 A1* | 10/2015 | Huang | H04L 51/12 709/203 |
| 2016/0358187 A1* | 12/2016 | Radocchia | H04L 63/0876 |
| 2017/0230403 A1* | 8/2017 | Kennedy | H04L 63/1483 |
| 2017/0243193 A1* | 8/2017 | Manian | G06Q 20/065 |

* cited by examiner

MESSAGING SYSTEMS AND METHODS THAT EMPLOY A BLOCKCHAIN TO ENSURE INTEGRITY OF MESSAGE DELIVERY

CROSS-REFERENCE TO RELATED APPLICATION

This application is a continuation of U.S. patent application Ser. No. 16/049,602, filed Jul. 30, 2018, which is a continuation of U.S. patent application Ser. No. 15/207,899, filed Jul. 12, 2016 (now U.S. Pat. No. 10,122,661 B2), which claims the benefit of U.S. Provisional Application No. 62/348,733, filed Jun. 10, 2016, all of which are incorporated herein by reference herein in their entirety.

TECHNICAL FIELD

Embodiments of the subject matter described herein relate generally electronic messaging systems and message delivery in such messaging systems. More particularly, embodiments of the subject matter relate to electronic messaging systems, methods, techniques, protocols, and methodologies for ensuring integrity in the delivery of electronic messages.

BACKGROUND

Today the use of electronic messaging systems is widespread. Email, text messaging, instant messaging, live chatting, etc. have become very common in everyday life to the point that nearly everyone uses some form of electronic messaging on a daily basis. Assuring the delivery, authenticity, and integrity of messages is very important to all senders and recipients, and particularly for senders who send messages to recipients for marketing or transactional purposes.

Messaging systems are often abused and used to distribute unwanted or undesirable messages (or other network traffic), which are commonly referred to as spam. Spam can refer to the practice of sending unwanted messages, frequently with commercial content, in large quantities to an indiscriminate set of recipients. One non-limiting example of spam is unsolicited bulk email, otherwise known as spam email or junk email. Spamming remains economically viable because advertisers have no operating costs beyond the management of their mailing lists, servers, infrastructures, IP ranges, and domain names, and it is difficult to hold senders accountable for their mass distribution of messages. Because the barrier to entry is so low, spammers are numerous, and the volume of unsolicited messages has become very high.

To combat spam, many different anti-spam techniques have been developed to distinguish between solicited or wanted messages, and unsolicited or unwanted spam messages. Anti-spam techniques can include end-user techniques that require actions by individuals, automated techniques for email administrators, and automated techniques for email senders. Some examples of automated techniques for email administrators include algorithmic filters and message authentication.

One unintended drawback of many existing solutions for distinguishing between "wanted" messages and spam messages is that they tend to produce false positives (e.g., "good" messages are marked as spam) and false negatives (e.g., "bad" messages are not marked as spam). In other words, many existing solutions can incorrectly identify a "wanted" message that a user wants to receive as being spam email and classify it as such (e.g., place it in a spam folder). Conversely, many existing solutions can incorrectly identify a spam message that a user does not want to receive and allow it to be forwarded to the user's inbox.

Each existing anti-spam technique has trade-offs between incorrectly rejecting legitimate messages (false positives) versus not rejecting all spam (false negatives). As such, there is a need for improved electronic messaging systems and technologies for delivering electronic messages.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented here relate to electronic messaging systems, methods, messaging protocols, procedures, and technology. The described subject matter can be implemented in the context of any computer-implemented messaging system. Moreover, the described subject matter can be implemented in connection with two or more separate and distinct computer-implemented server systems that communicate with one another.

To address the issues discussed above, systems and methods are provided that use blockchain (or equivalent) technologies to address challenges presented in message delivery and integrity. In one embodiment, a messaging system is provided that includes a first message server, a second message server and a distributed database system that stores a blockchain. The first message server receives a message from a first user system, and records at least one selected component of the received message into a block of the blockchain that is stored in the distributed database system. When the second message server receives the messages from the first message server, the second message server can determine whether a component from the received message matches the selected component that is stored in the block of the blockchain. The disclosed embodiments can help ensure that messages and attachments to those messages have not been modified during transit over a network.

The disclosed embodiments can also better identify legitimate (wanted) messages and distinguish them from illegitimate (unsolicited) messages. Used properly, the immutability and distributed nature of the blockchain can make it impossible to modify information once it has been committed to the blockchain. This permanence applies to all information, which can include things like sender and recipient information. The disclosed embodiments can also solve problems such as the authenticity of medical records, educational transcripts, deeds, property rights, legal documents, etc.

Figure 1:
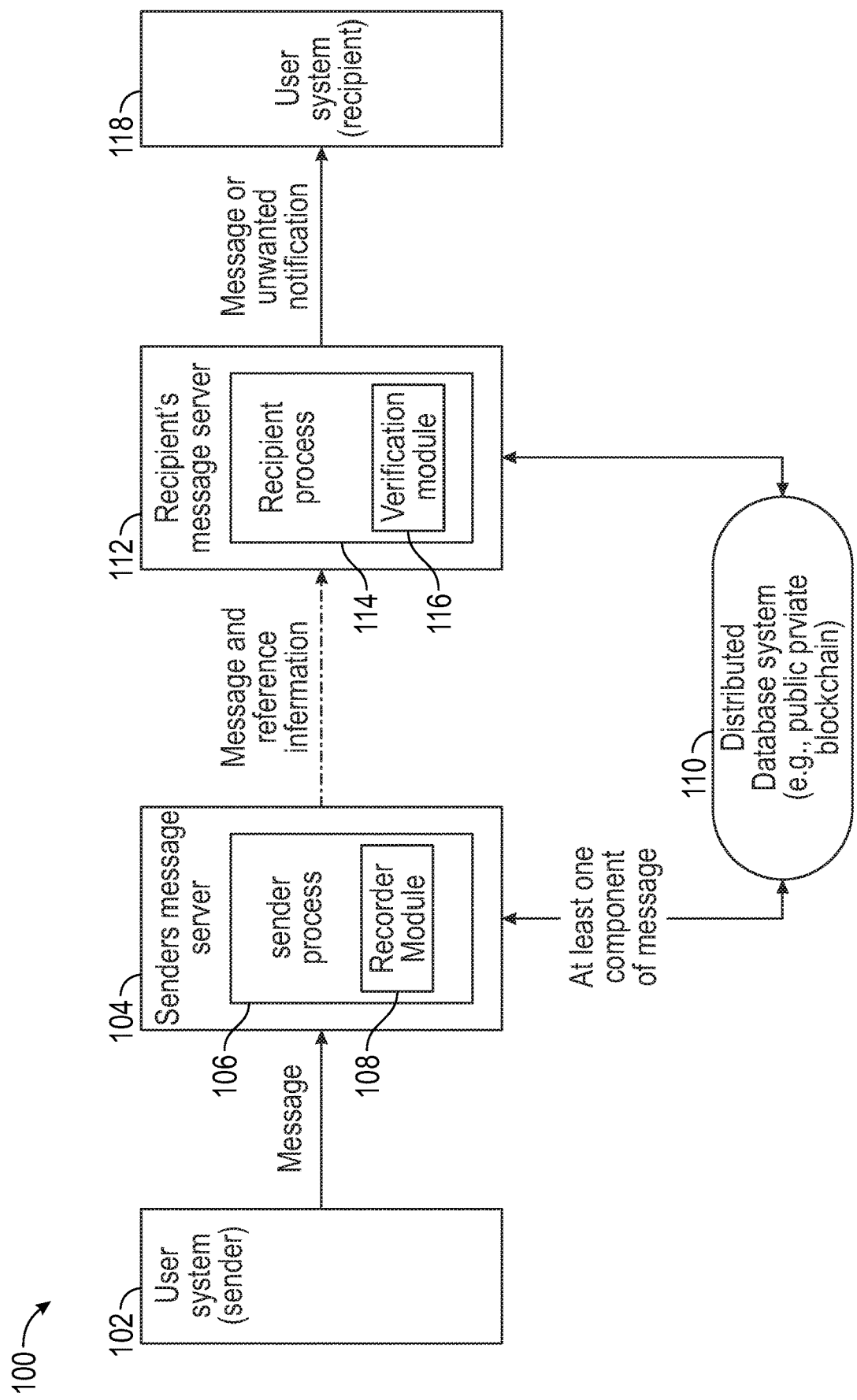
FIG. 1 is a block diagram of messaging system that illustrates an exemplary message delivery flow in accordance with the disclosed embodiments.

FIG. 1 is a block diagram of messaging system 100 that illustrates an exemplary message delivery flow in accordance with the disclosed embodiments. The messaging system 100 includes a user system 102, a message server 104, a distributed database system 110, a message server 112, and a user system 118. The first message server 104 includes a sender process 106 includes a recorder module 108. The second message server 112 includes a recipient process 114 that includes a verification module 116.

In the description that follows, to distinguish between the user systems, the user systems will be referred to as a first user system 102 and a second user system 118. Likewise, to distinguish between the message servers in the description that follows, the message servers will be referred to as a first message server 104 and a second message server 112. It should be appreciated that while FIG. 1 illustrates a simplified example with two user systems and two message servers, any number of user systems and message servers can be included in a practical implementation.

Further, although the first user system 102 will be described as being the sender of the message, and the second user system 118 will be described as being the recipient of the message, this description is for purposes of illustrating one example of a message delivery flow, and that any user system can be the sender of a message, the recipient of a message, or both. Likewise, although the message server 104 will be described as being the sender's message server, and the message server 112 will be described as being the recipient's message server, this description is for purposes of illustrating one example of a message delivery flow, and that any user system can be the sender of a message, the recipient of a message, or both.

The user systems 102, 118 can be any type of computer is capable of connecting to and communicating messages over a data communication network (not illustrated). The data communication network can include the message servers 104, 112 and the distributed database system 110 among many other things. For example, the user systems can be a handheld computing device, a mobile phone, a laptop computer, a work station, and/or a network of computing devices. The data communication network that a user systems communicate over can be any one or any combination of a local area network (LAN), wide area network (WAN), telephone network, wireless network, point-to-point network, star network, token ring network, hub network, or other appropriate configuration. The data communication network provides and supports data connectivity between the user systems 102, 118 and a system that includes the message servers 104, 112. In practice, the data communication network may be any digital or other communications network capable of transmitting messages or data between devices, systems, or components. In certain embodiments, the data communication network includes a packet switched network that facilitates packet-based data communication, addressing, and data routing. The packet switched network could be, for example, a wide area network, the Internet, or the like. In various embodiments, the data communication network includes any number of public or private data connections, links or network connections supporting any number of communications protocols. The data communication network may include the Internet, for example, or any other network based upon a transfer control protocol and Internet protocol (TCP/IP) or other conventional protocols. That network will be used in many of the examples herein. However, it should be understood that the networks used with the embodiment described herein use are not so limited, although TCP/IP is a frequently implemented protocol. In various embodiments, the data communication network could also incorporate a wireless and/or wired telephone network, such as a cellular communications network for communicating with mobile phones, personal digital assistants, and/or the like. The data communication network may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

As used herein, a "message" can refer to an electronic communication sent from one computer to one or more other computers. A message is typically sent from one participant in a conversation taking place with another participant during a messaging session. A message comprises a number of components (as will be described below). A message can be of any size from a single bit to petabytes (or more). In this regard, it is noted that the messages can be any type of electronic messages that are communicated via any type of messaging system. For instance, in one exemplary embodiment in which the computer-implemented messaging system is an electronic mail system, the messages can be email messages and the messaging protocol can be an electronic mail protocol (e.g., STMP or improvement thereof). However, it should be appreciated that this example is non-limiting, and that the messaging system 100 (or messaging system) can be any type of messaging systems including, for example, short messages service (SMS) messaging systems (e.g., text messaging systems), chat messaging systems, voice messaging systems, an instant message (IM) system, a message posting feature of a social networking website, website wall posting systems, blog posting systems, Person-to-Person (P2P) messaging systems, Person-to-Machine (P2M) messaging systems, Machine-to-Machine (M2M) messaging systems, and Machine-to-Person (M2P) messaging systems, etc. As such, a message could be an email message, a SMS message, a text message, a chat message, a voice message, an instant message, a social networking website message, a message posted on a website wall or blog, a P2P message, a P2M message, a M2M message, a M2P message, etc.

Regardless of the type of messaging system, each message comprises a number of components that make up the message. In general terms, a message can include a header and a body. The header contains routing information used to transport the message. For instance, the header can include things like the source of the message (or information that identifies who the message is from), the destination (or information that identifies who the message is to), information regarding a protocol used to transport the message, time stamps, etc. The body of the message includes that data that makes up the message itself. The header and the body of a message can both include multiple components that can be recorded and serve as proof that a message was sent and/or that a message was sent or received. As used herein, the term "component," when used with reference to a message, refers to a part of a message that can serve a proof that a message was sent and/or that a message was sent or received. Examples of components can include information regarding one or more of the following: information that identifies at least one participant (e.g., a sender or a recipient of the message); time information associated with the message such as day, date or time that the message was sent or received; information regarding language the message is written in; information regarding protocol used to communicate the message; information regarding subject of the message; information regarding payload of the message; information from the body of the message; information from attachments to the message or information describing attachments to the message; information regarding originating network address of the message, etc. A particular message can include any number of components and must include certain fundamental components. In one embodiment, the fundamental components include (at a minimum) information regarding who the message is being sent from, information regarding who the message is being sent to, and a body or payload of the message. The body or payload of the message can include one or more of textual information, images, symbols, sound files, video files, attachments, etc. In addition to these fundamental components, each message can include many other components that depend on the particular implementation.

Each of the message servers 104, 112 (sometimes also referred to as messaging servers) can represent one or more physical server devices that execute an application that handles messages communicated between two or more applications. It should be appreciated that the message servers 104, 112 can be identical in that they can both execute a sender process and a recipient process even though not illustrated that way in FIG. 1 for ease of understanding. Likewise, the message servers 104, 112 can both execute a recorder module and a verification module even though they are not illustrated in FIG. 1.

As used herein, the distributed database system 110 can refer to a database that is distributed across a network of interconnected computer nodes, and is commonly known as a blockchain, where each node stores a complete copy of the blockchain. The blockchain is a distributed database that maintains a continuously-growing list of data records hardened against tampering and revision.

The blockchain includes a chain of linked blocks that represent a complete transaction history. Each block can store a reference that links that block to a previous block in the chain, a summary of the transaction (e.g., one or more components of a message), a time stamp, and Proof of Work that went into creating the secure block. The reference that links that block to the previous block and to each additional block reinforces those before it. For example, each block can include a hash of the prior block thereby linking the blocks together.

The blockchain keeps track of the fact that events/transactions have happened. In accordance with the disclosed embodiments, a "transaction" can refer to a message being sent from one computer to another computer. One or more components of a message can be recorded in a block of the blockchain to represent that message being sent. In other words, the one or more components of the message that are recorded into the blockchain serve as information that represents that the message was sent. This information can then be used to verify or prove or represent the fact that message was sent and/or received. After the transaction is recorded, it must then be validated before being added into the blockchain.

To explain further, a transaction is not added to the blockchain until it is recognized as valid. For a transaction to be added to the block chain, other participants in the given system must approve/validate the transaction. This helps ensure that only valid transactions are added to the blockchain. To validate the transaction, the transaction can be sent (e.g., broadcast) to nodes of other participants who are part of (or belongs to) a given system. Each node can validate a transaction, add it to their copy of the blockchain and then broadcast the addition to other nodes. After a number of those other participants approve or validate the transaction, the transaction can be added to the chain, which provides a record of the transactions existence. This record cannot be tampered with because each of the other participants has a copy.

As will be described in greater detail below, by recording meta information pertaining to the message into a Blockchain during a server-side sending process, including, but not limited to the hash of a legitimate message, and allowing the server-side recipient to verify the recorded information, both senders and recipients can be provided with a secure, and anonymous, method to ensure the integrity of all message communications.

As will be described in greater detail below, a processing system of the message server 104 can execute the recorder module 108 (as part of a sender process 106) to record selected component(s) from a message received from the user system 105 in a block of a blockchain at the distributed database system 110. A processing system of the recipient's message server 112 can execute the verification module 116 (as part of a recipient process 114) to determine whether selected component(s) of a received message match (or partially match) component(s) stored in a corresponding block at the distributed database system 110, and then take appropriate actions such as marking the message as wanted or unwanted depending on the result of that matching analysis and any further processing performed by the verification module 116. Tasks performed by the various elements in FIG. 1 will be described in greater detail below with reference to FIGS. 2 and 3. For example, certain operations performed by the message servers 104, 112 and the distributed database system 110 will be described below. In that regard, FIGS. 2 and 3 will be described with continued reference to FIG. 1.

Figure 2:
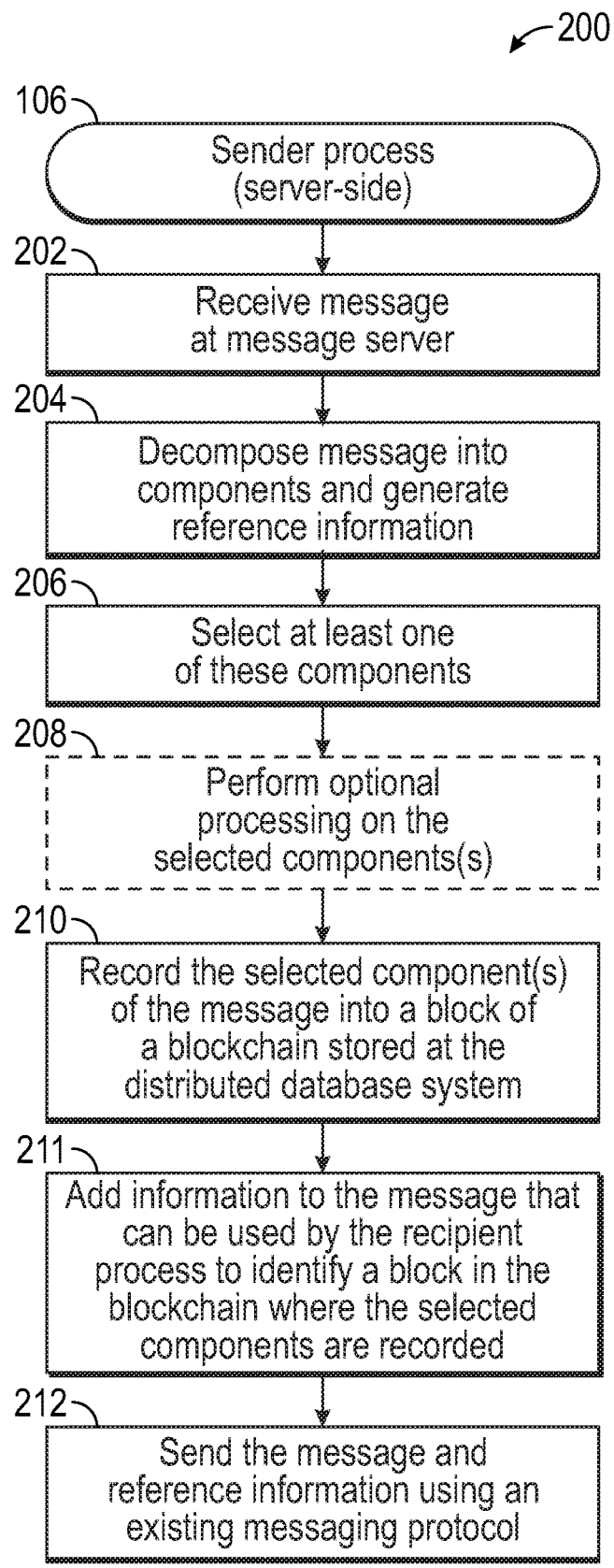
FIG. 2 is a flow chart that illustrates an exemplary method performed by a sender process of a message server in accordance with the disclosed embodiments.

FIG. 2 is a flow chart that illustrates an exemplary method 200 performed by a sender process 106 of a message server 104 in accordance with the disclosed embodiments. As a preliminary matter, it should be understood that steps of the method 200 are not necessarily limiting, and that steps can be added, omitted, and/or performed simultaneously without departing from the scope of the appended claims. It should be appreciated that the method 200 may include any number of additional or alternative tasks, that the tasks shown in FIG. 2 need not be performed in the illustrated order, and that the method 200 may be incorporated into a more comprehensive procedure or process having additional functionality not described in detail herein. Moreover, one or more of the tasks shown in FIG. 2 could be omitted from an embodiment of the method 200 as long as the intended overall functionality remains intact. It should also be understood that the illustrated method 200 can be stopped at any time. The method 200 is computer-implemented in that various tasks or steps that are performed in connection with the method 200 may be performed by software, hardware, firmware, or any combination thereof. For illustrative purposes, the following description of the method 200 may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIG. 2 that follows, the sender process 106 of the message server 104 will be described as performing various acts, tasks or steps, but it should be appreciated that this refers to processing system(s) of the message servers 104 executing instructions to perform those various acts, tasks or steps. Depending on the implementation, the processor systems of the message server 104 can be centrally located, or distributed among a number of server systems that work together. Furthermore, in the description of FIG. 2, a particular example is described in which the first user system 102 sends a message that is destined for the second user system 118, but the opposite could also be true.

The method 200 begins at 202 when the first message server 104 receives the message from the first user system 102.

At 204, a sender process 106 that executes at the first message server 104 processes the message to separate it into its components. For example, in one embodiment, the sender process 106 can decompose the message into its constituent components. At 204, the sender process 106 also generates reference information associated with that message. As used herein, the term "reference information" refers to meta information pertaining the message being sent that can be sent to the recipient process 114. The reference information can tell the recipient process that the message is a message that needs to be checked against a blockchain, and can instruct the recipient process on how to access the block chain.

At 206, the sender process 106 can select at least one of the components that is to be recorded.

In some embodiments, at 208, the sender process 106 may optionally perform additional processing on the selected component(s) to interpret or learn something more about one or more of the component(s) prior to recording it. The additional processing that can be performed is highly dependent on the type of messaging system and the desired implementation. Examples of additional processing that can be performed can include, but are not limited to, voice recognition, image recognition, machine learning algorithms, artificial intelligence, etc.

At 210, the recorder module 108 of the sender process 106 can record the selected component(s) from the message in a block of a blockchain at 110.

At 211, the sender process 106 can add information to the message that can be used by the recipient process 114 to identify the block in the blockchain where the selected component(s) of the message are recorded. For example, in one embodiment, the sender process 106 can add a header to the message that can be used by the recipient process to identify which block in the blockchain where the selected components are recorded. In one implementation, the header can include a token that can be used by the recipient process to identify which block in the blockchain where the selected components are recorded.

At 212, the sender process 106 can send the message to the second message server 112 along with the reference information associated with that message (that was generated at 204). Although the sender process 106 can communicate directly with second message server 112, it should be appreciated that the sender process 106 can communicate indirectly with the second message server 112 via any number of many additional really servers (not illustrated) that can be included in the path between the first message server 104 and the second message server 112. The relay servers relay the message and reference information from the first message server 104 until it reaches its destination, which is the second message server 112 in this particular example.

Figure 3A:
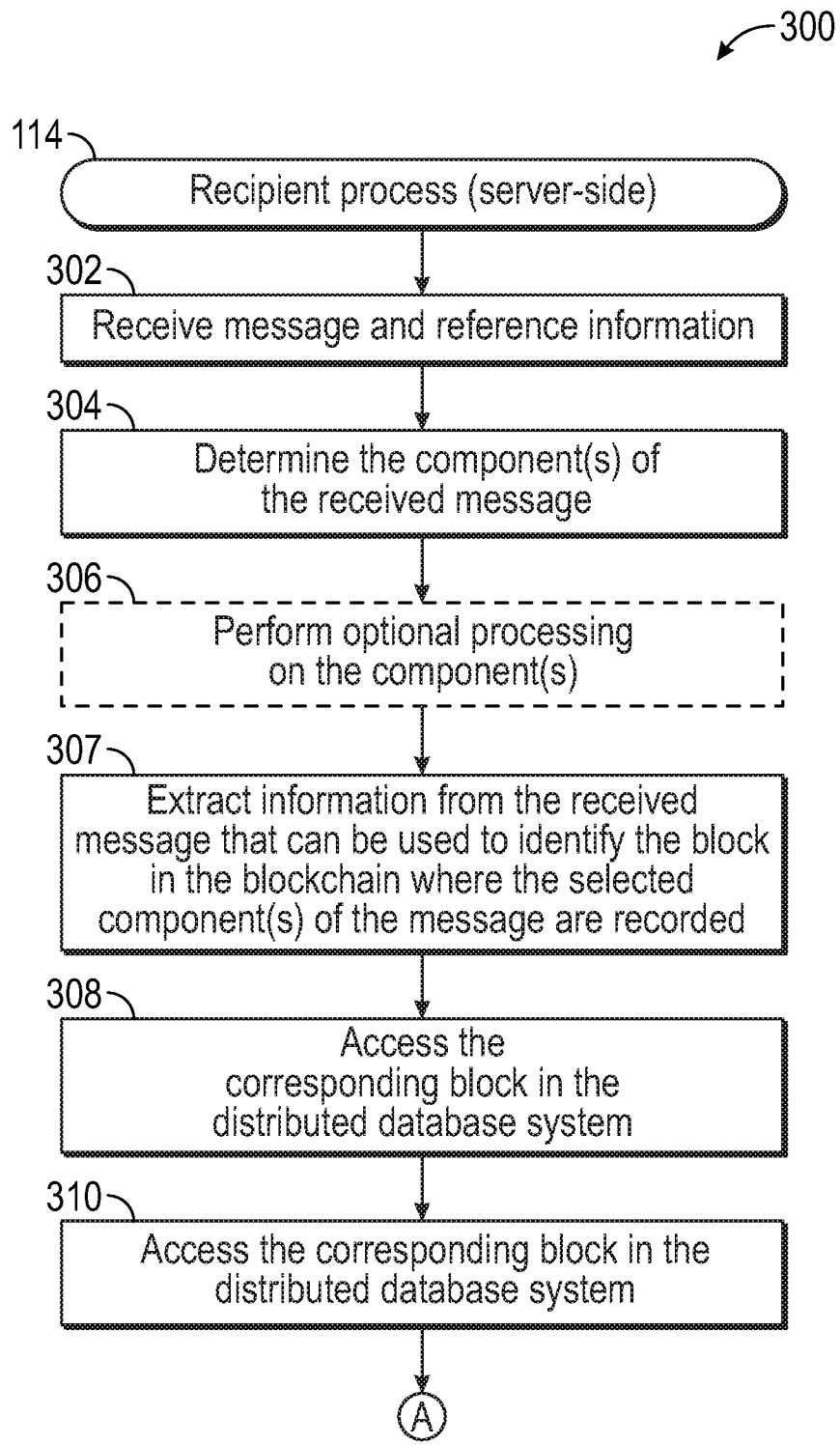
FIGS. 3A and 3B collectively illustrate a flowchart that illustrates an exemplary method performed by a recipient process of a message server in accordance with the disclosed embodiments.
Figure 3B:
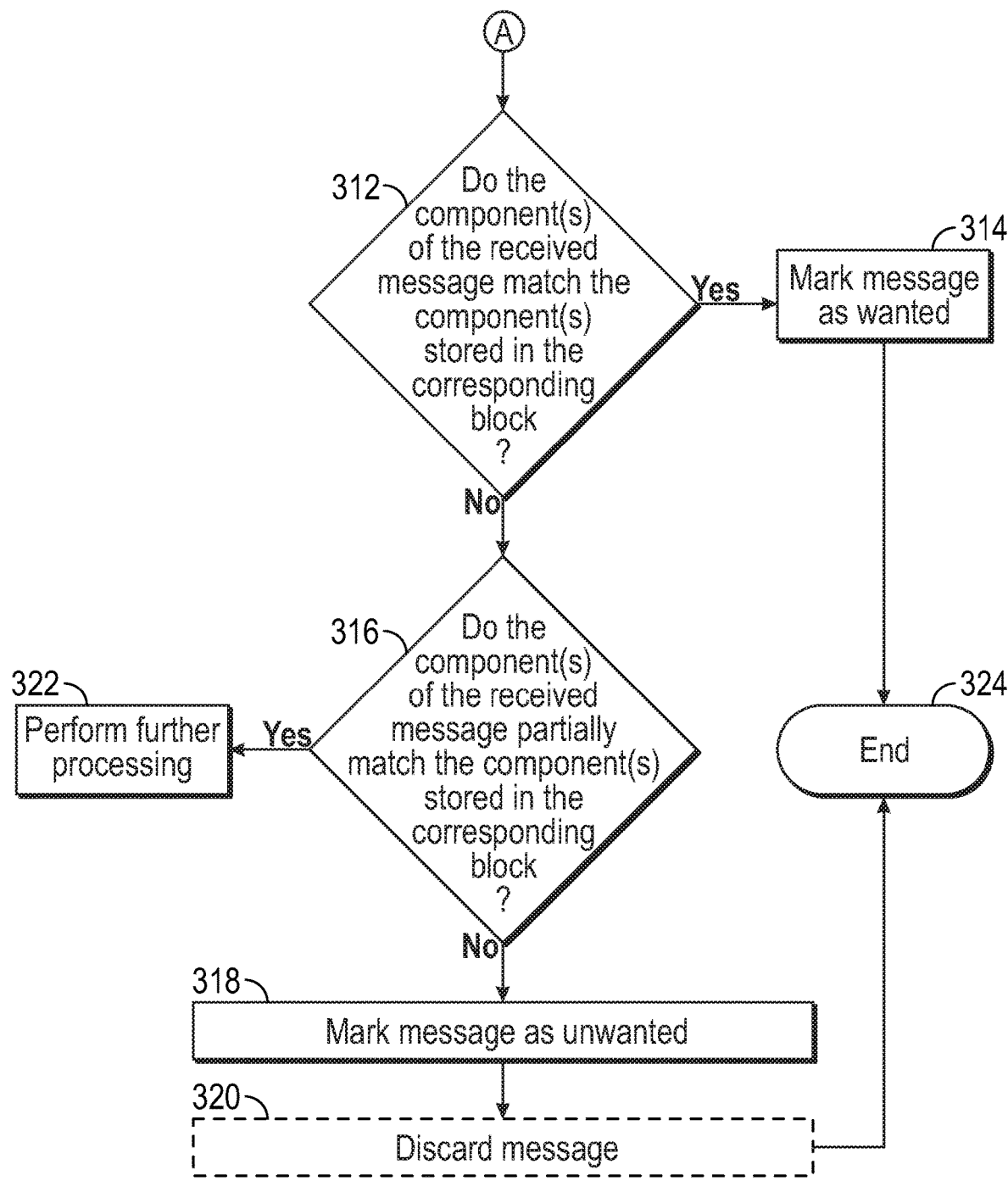

FIGS. 3A and 3B collectively illustrate a flowchart that illustrates an exemplary method 300 performed by a recipient process 114 of a message server 112 in accordance with the disclosed embodiments. As described above with reference to FIG. 2, it should be understood that steps of the method 300 are not necessarily limiting, and that steps can be added, omitted, and/or performed simultaneously without departing from the scope of the appended claims. It should be appreciated that the method 300 may include any number of additional or alternative tasks, that the tasks shown in FIGS. 3A and 3B need not be performed in the illustrated order, and that the method 300 may be incorporated into a more comprehensive procedure or process having additional functionality not described in detail herein. Moreover, one or more of the tasks shown in FIGS. 3A and 3B could be omitted from an embodiment of the method 300 as long as the intended overall functionality remains intact. It should also be understood that the illustrated method 300 can be stopped at any time. The method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIG. 1. In certain embodiments, some or all steps of this process, and/or substantially equivalent steps, are performed by execution of processor-readable instructions stored or included on a processor-readable medium, for example. For instance, in the description of FIGS. 3A and 3B that follows, the recipient process 114 of the message server 112 will be described as performing various acts, tasks or steps, but it should be appreciated that this refers to processing system(s) of the message server 112 executing instructions to perform those various acts, tasks or steps. Depending on the implementation, the processor systems of the message server 112 can be centrally located, or distributed among a number of server systems that work together. Furthermore, in the description of FIGS. 3A and 3B, a particular example is described in which the second user system 118 receives a message that was communicated from the first user system 102, but the opposite could also be true.

The method 300 begins at 302 when the recipient process 114 that executes at the first message server 104 receives the message that was sent from the sender process 106 of first user system 102 along with the reference information associated with that message.

Upon receiving the message, and its associated reference information, the recipient process 114 of the second message server 112 determines the components of the received message at 304. In some embodiments, at 306, the recipient process 114 can optionally perform additional processing of the component(s) of the received message to interpret or learn something more about one or more of the component(s). The additional processing that can be performed is highly dependent on the type of messaging system and the desired implementation. Examples of additional processing that can be performed can include, but are not limited to, voice recognition, image recognition, machine learning algorithms, artificial intelligence, and other types of processing of the component(s) of the received message that allow the recipient process 114 to interpret or learn something more about one or more of the component(s).

At 307, the recipient process 114 can extract information from the received message that can be used by the recipient process 114 to identify the block in the blockchain where the selected component(s) of the message are recorded. For example, in one embodiment, the recipient process 114 can process the header (that was added to the message by the sending process) to extract information (e.g., a token), and then use that extracted information to identify which block in the blockchain where the selected components are recorded.

At 308, the recipient process 114 of the second message server 112 uses the extracted information to access a corresponding block that is stored at the distributed database system 110, and at 310, selects one or more component(s) from the received message that correspond to the component(s) stored in the corresponding block of the distributed database system 110.

At 312, the verification module 116 of the recipient process 114 can determine whether selected component(s) of the received message match the component(s) stored in a corresponding block at the distributed database system 110. In one embodiment, the selected component(s) of the received message will be determined to match the component(s) stored in a corresponding block when every component of the received message identically matches the corresponding component(s) stored in the corresponding block.

When the verification module 116 determines (at 312) that the selected component(s) of the received message match the component(s) stored in a corresponding block at the distributed database system 110, the verification module 116 can mark the message as "wanted."

By contrast, when the verification module 116 determines (at 312) that the selected component(s) of the received message do not match the component(s) stored in a corresponding block at the distributed database system 110, the verification module 116 can then determine (at 316) whether any of the selected component(s) of the received message partially match the component(s) stored in the corresponding block at the distributed database system 110. In one embodiment, the selected component(s) of the received message will be determined to partially match the component(s) stored in a corresponding block when some of the components (e.g., one or more of the components) of the received message identically match the corresponding component(s) stored in the corresponding block. For example, in one implementation, the selected component(s) of the received message will be determined to partially match the component(s) stored in a corresponding block when a certain percentage of the components (e.g., 75% or more of the components) of the received message identically match the corresponding component(s) stored in the corresponding block. While 75% is given as one non-limiting example, it should be appreciated that this number is non-limiting and can be set to any percentage desired by an administrator, the sender or the recipient.

When the verification module 116 determines (at 316) that none of the selected component(s) of the received message partially match the component(s) stored in the corresponding block at the distributed database system 110 (i.e., determines that the component(s) of the received message do not partially match component(s) that are stored in the corresponding block), then the verification module 116 can mark the message as "unwanted" at 318, and in some implementations can perform other actions at 320 such as discarding the message.

When the verification module 116 determines (at 316) that one or more of the selected component(s) of the received message partially match the component(s) stored in the corresponding block at the distributed database system 110 (i.e., determines that one or more of the component(s) of the received message do partially match one or more of component(s) that are stored in the corresponding block), then the verification module 116 can perform further processing at 322 to determine whether the message is "wanted" or "unwanted." In some cases, after further processing the component(s) of the received message, the method 300 can decide that the message is "wanted" or "unwanted," and in some implementations, if the verification module 116 determines that the message is unwanted, then it can discard the message. What type of further processing is performed at 322 depends on the implementation, but can include things such as heuristic comparison, machine learning algorithms, etc.

Figure 4:
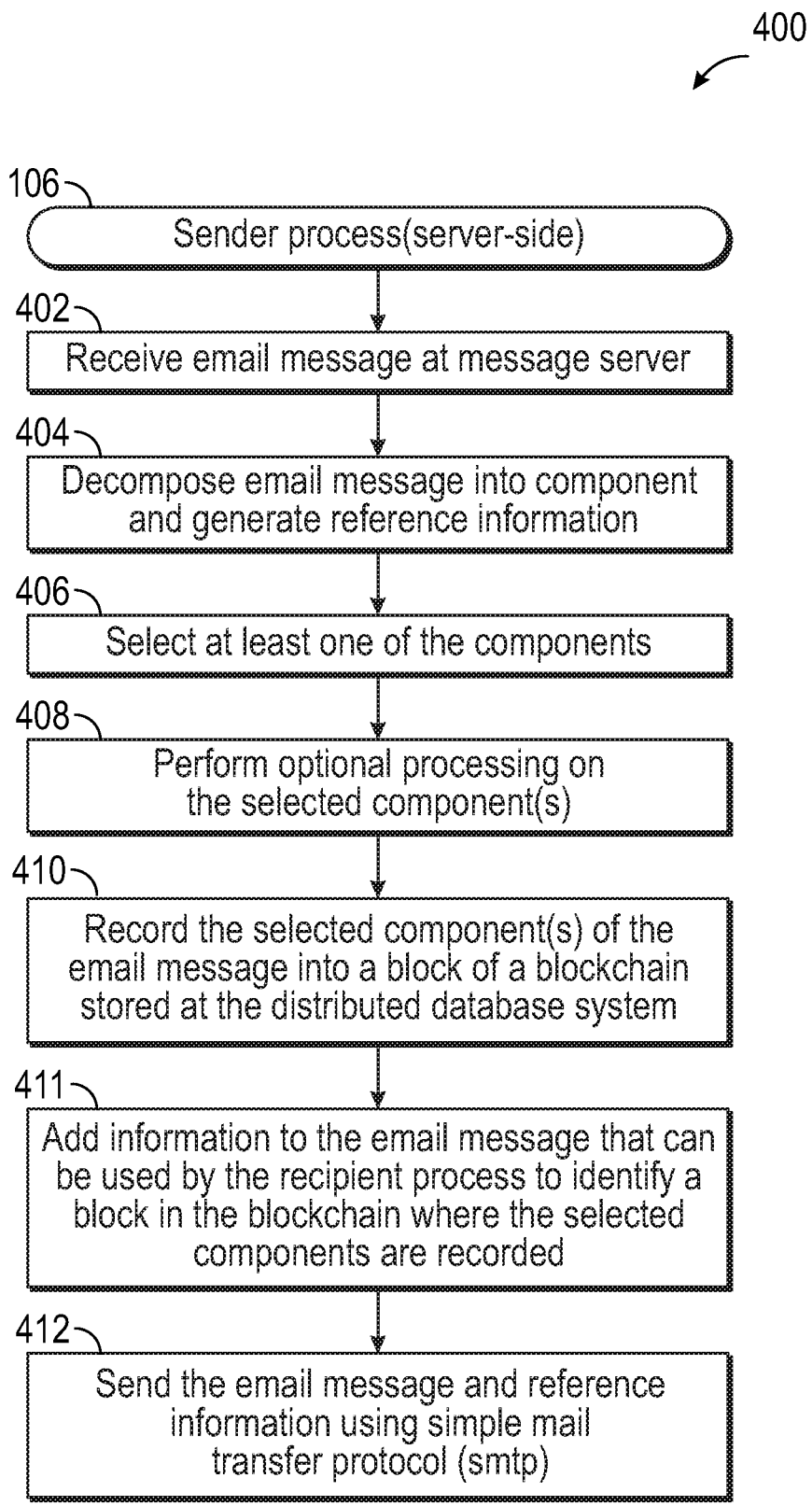
FIG. 4 is a flow chart that illustrates an exemplary method performed by a sender process of a message server in accordance with the disclosed embodiments.

FIG. 4 is a flow chart that illustrates an exemplary method 400 performed by a sender process 106 of a message server 104 in accordance with the disclosed embodiments. As a preliminary matter, it should be understood that steps of the method 400 are not necessarily limiting, and that steps can be added, omitted, and/or performed simultaneously without departing from the scope of the appended claims. It should be appreciated that the method 400 may include any number of additional or alternative tasks, that the tasks shown in FIG. 4 need not be performed in the illustrated order, and that the method 400 may be incorporated into a more comprehensive procedure or process having additional functionality not described in detail herein. Moreover, one or more of the tasks shown in FIG. 4 could be omitted from an embodiment of the method 400 as long as the intended overall functionality remains intact. It should also be understood that the illustrated method 400 can be stopped at any time. The method 400 is computer-implemented in that various tasks or steps that are performed in connection with the method 400 may be performed by software, hardware, firmware, or any combination thereof. For illustrative purposes, the following description of the method 400 may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIG. 4 that follows, the sender process 106 of the message server 104 will be described as performing various acts, tasks or steps, but it should be appreciated that this refers to processing system(s) of the message servers 104 executing instructions to perform those various acts, tasks or steps. Depending on the implementation, the processor systems of the message server 104 can be centrally located, or distributed among a number of server systems that work together. In this particular embodiment that is described with reference to FIGS. 4 and 5, the message is an email message that is sent from the first user system 102 and destined for the second user system 118, but the opposite could also be true.

The method 400 begins at 402 when the first message server 104 receives the email message from the first user system 102.

At 404, a sender process 106 that executes at the first message server 104 processes the email message to separate it into its components. For example, in one embodiment, the sender process 106 can decompose the email message into its constituent components, which can be, without limitation, one or more of: at least one part of an email address of at least one participant (e.g., username, mail server, top-level domain of the sender's or recipient's email address); IP address of at least one participant; time information associated with the email message such as day, date or time that the email message was sent or received; routing information regarding the path the email takes among mail transfer agents (MTAs); information regarding language the email message is written in; information regarding the version of the SMTP used to communicate the email message; information regarding subject of the email message; information regarding payload of the email message; information from the body of the email message including textual content, signature, or other automatically generated text inserted by the sender's email server; information from attachments to the email message or information describing attachments to the email message; information regarding originating network address of the email message, etc.

At 404, the sender process 106 also generates reference information associated with that email message.

At 406, the sender process 106 can select at least one of the components that is to be recorded. In some embodiments, at 408, the sender process 106 may optionally perform additional processing on the selected component(s) as described above with respect to FIG. 2.

At 410, the recorder module 108 of the sender process 106 can record the selected component(s) from the email message in a block of a blockchain at 110.

At 411, the sender process 106 can add information to the message that can be used by the recipient process 114 to identify the block in the blockchain where the selected component(s) of the email message are recorded. For example, in one embodiment, the sender process 106 can add a header to the email message that can be used by the recipient process 114 to identify which block in the blockchain where the selected components are recorded. In one implementation, the header can include a token that can be used by the recipient process 114 to identify which block in the blockchain where the selected components are recorded.

At 412, the sender process 106 can send the email message to the second message server 112 along with the reference information associated with that email message (that was generated at 404). As noted above with reference to FIG. 2, it should be appreciated that the sender process 106 can communicate indirectly with the second message server 112 via any number of many additional relay servers (not illustrated) that can be included in the path between the first message server 104 and the second message server 112. The relay servers can relay the email message and the reference information from the first message server 104 until it reaches its destination, which is the second message server 112.

Figure 5A:
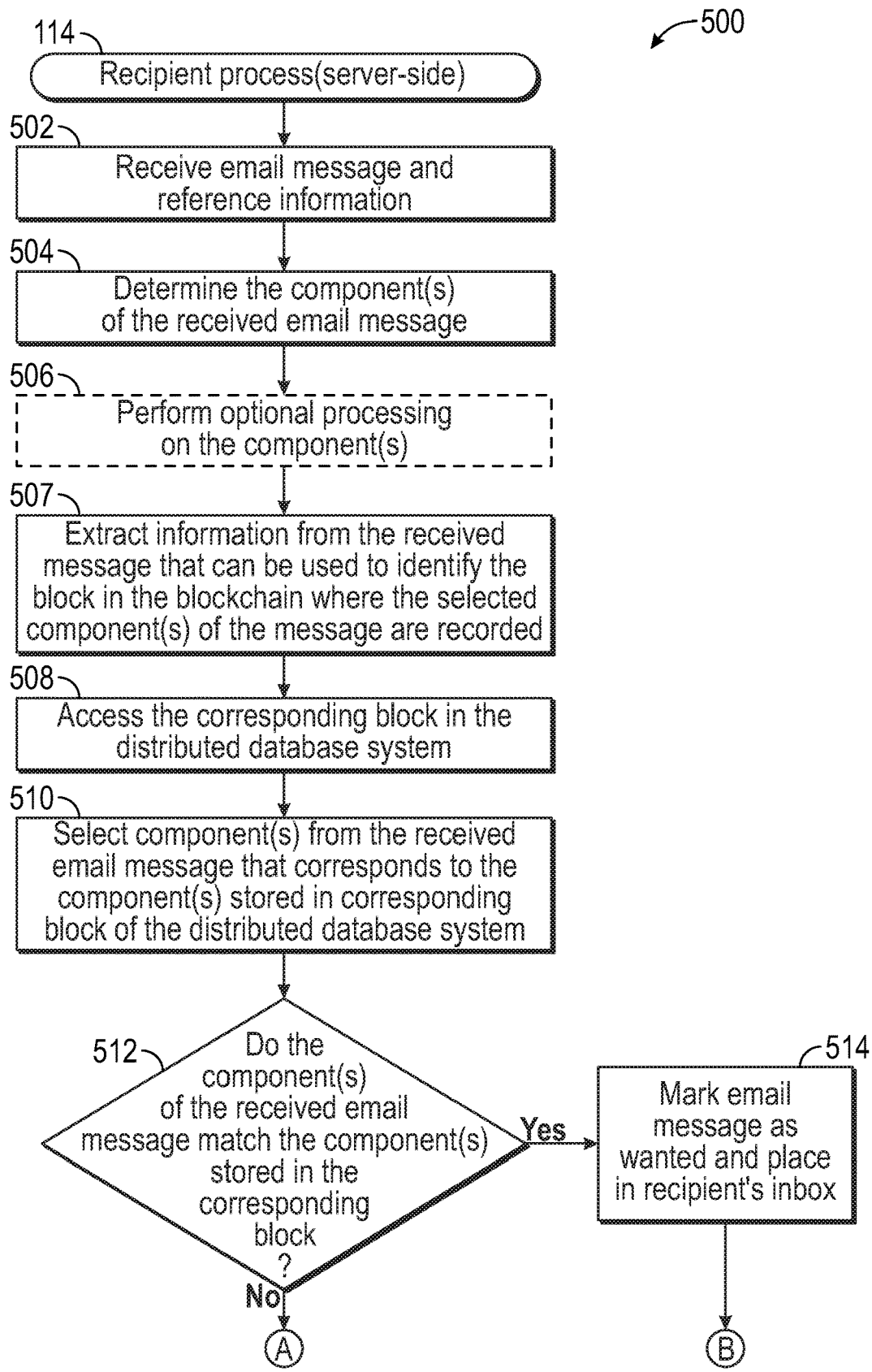
FIGS. 5A and 5B collectively illustrate a flowchart that illustrates an exemplary method performed by a recipient process of a message server in accordance with the disclosed embodiments.
Figure 5B:
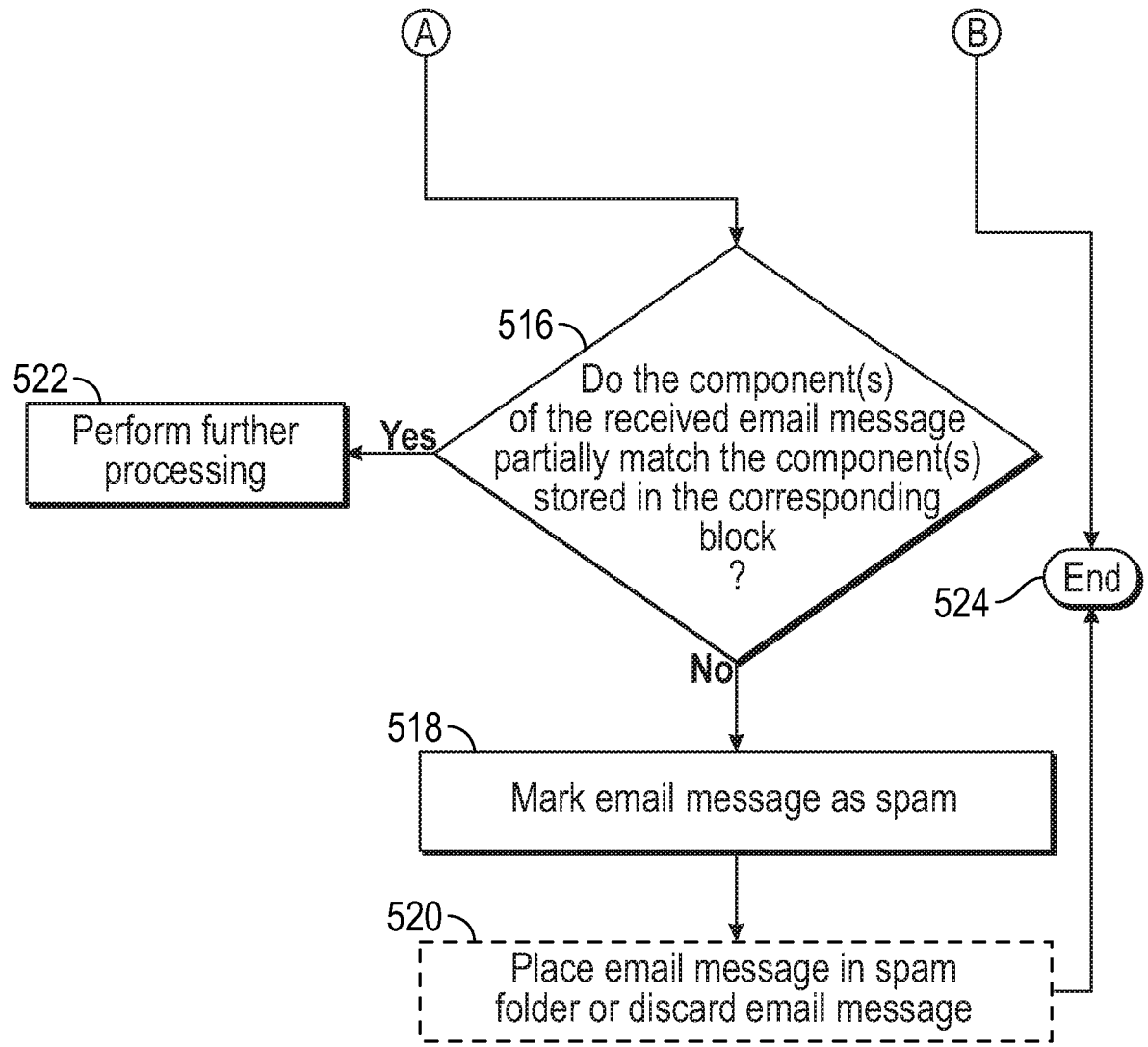

FIGS. 5A and 5B collectively illustrate a flowchart that illustrates an exemplary method 500 performed by a recipient process 114 of a message server 112 in accordance with the disclosed embodiments. As described above with reference to FIG. 4, it should be understood that steps of the method 500 are not necessarily limiting, and that steps can be added, omitted, and/or performed simultaneously without departing from the scope of the appended claims. It should be appreciated that the method 500 may include any number of additional or alternative tasks, that the tasks shown in FIGS. 5A and 5B need not be performed in the illustrated order, and that the method 500 may be incorporated into a more comprehensive procedure or process having additional functionality not described in detail herein. Moreover, one or more of the tasks shown in FIGS. 5A and 5B could be omitted from an embodiment of the method 500 as long as the intended overall functionality remains intact. It should also be understood that the illustrated method 500 can be stopped at any time. The method 500 is computer-implemented in that various tasks or steps that are performed in connection with the method 500 may be performed by software, hardware, firmware, or any combination thereof. For illustrative purposes, the following description of the method 500 may refer to elements mentioned above in connection with FIG. 1. In certain embodiments, some or all steps of this process, and/or substantially equivalent steps, are performed by execution of processor-readable instructions stored or included on a processor-readable medium, for example. For instance, in the description of FIGS. 5A and 5B that follows, the recipient process 114 of the message server 112 will be described as performing various acts, tasks or steps, but it should be appreciated that this refers to processing system(s) of the message server 112 executing instructions to perform those various acts, tasks or steps. Depending on the implementation, the processor systems of the message server 112 can be centrally located, or distributed among a number of server systems that work together. Furthermore, in the description of FIGS. 5A and 5B, a particular example is described in which the second user system 118 receives an email message that was communicated from the first user system 102, but the opposite could also be true.

The method 500 begins at 502 when the recipient process 114 that executes at the first message server 104 receives the email message that was sent from the sender process 106 of the first user system 102 along with the reference information associated with that email message.

Upon receiving the email message, and its associated reference information, the recipient process 114 of the second message server 112 determines the components of the received email message at 504. In some embodiments, at 506, the recipient process 114 can optionally perform additional processing of the component(s) of the received email message that can include, but is not limited to, voice recognition, image recognition, machine learning algorithms, artificial intelligence, etc.

At 507, the recipient process 114 can extract information from the received email message that can be used by the recipient process 114 to identify the block in the blockchain where the selected component(s) of the email message are recorded. For example, in one embodiment, the recipient process 114 can process the header (that was added to the email message by the sending process) to extract information (e.g., a token), and then use that extracted information to identify which block in the blockchain where the selected components are recorded.

At 508, the recipient process 114 of the second message server 112 uses the extracted information to access a corresponding block that is stored at the distributed database system 110, and at 510, selects one or more component(s) from the received email message that correspond to the component(s) stored in the corresponding block of the distributed database system 110.

At 512, the verification module 116 of the recipient process 114 can determine whether selected component(s) of the received email message match the component(s) stored in a corresponding block at the distributed database system 110. In one embodiment, the selected component(s) of the received email message will be determined to match the component(s) stored in a corresponding block when every component of the received email message identically matches the corresponding component(s) stored in the corresponding block.

When the verification module 116 determines (at 512) that the selected component(s) of the received email message match the component(s) stored in a corresponding block at the distributed database system 110, the verification module 116 can mark the email message as "wanted," and sends the email message to an inbox of the user system. For example, in one implementation, if a selected component of the received email message is a sender's e-mail address and a component stored in a corresponding block is the same sender's e-mail address, then the verification module 116 will determine that there is a match and can mark the email message as wanted and send the email message to an inbox of the recipient's user system.

By contrast, when the verification module 116 determines (at 512) that the selected component(s) of the received email message do not match the component(s) stored in a corresponding block at the distributed database system 110, the verification module 116 can then determine (at 516) whether any of the selected component(s) of the received email message partially match the component(s) stored in the corresponding block at the distributed database system 110. In one embodiment, the selected component(s) of the received email message will be determined to partially match the component(s) stored in a corresponding block when some of the components (e.g., one or more of the components) of the received email message identically match the corresponding component(s) stored in the corresponding block.

For example, in one implementation, the selected component(s) of the received email message will be determined to partially match the component(s) stored in a corresponding block when a certain percentage of the components (e.g., 75% or more of the components) of the received email message identically match the corresponding component(s) stored in the corresponding block. While 75% is given as one non-limiting example, it should be appreciated that this number is non-limiting and can be set to any percentage desired by an administrator, the sender or the recipient. For instance, in one implementation, if a selected components of the received email message is a sender's e-mail address, a subject of the email, a signature from the body of the email, and a name of an attachment, and components stored in a corresponding block include the same sender's e-mail address, the same subject, and an attachment name that is the same, then the verification module 116 will determine that there is a partial match and can mark the email message as wanted and send the email message to an inbox of the recipient's user system. By contrast, if the components stored in a corresponding block include the same sender's e-mail address and the same subject, but no other common components, then the verification module 116 will determine that there is not a partial match and can mark the email message as spam and send the email message to a spam folder of the recipient's user system.

When the verification module 116 determines (at 516) that none of the selected component(s) of the received email message partially match the component(s) stored in the corresponding block at the distributed database system 110 (i.e., determines that the component(s) of the received email message do not partially match component(s) that are stored in the corresponding block), then the verification module 116 can mark the email message as "spam" at 518, and in some implementations can perform other actions at 520 such as discarding the email message.

When the verification module 116 determines (at 516) that one or more of the selected component(s) of the received email message partially match the component(s) stored in the corresponding block at the distributed database system 110 (i.e., determines that one or more of the component(s) of the received email message do partially match one or more of component(s) that are stored in the corresponding block), then the verification module 116 can perform further processing at 522 to whether the email message is "wanted" or "spam." What type of further processing is performed at 522 depends on the implementation, but can include things such as heuristic comparison, machine learning algorithms, etc. In some cases, after further processing the component(s) of the received email message, the method 500 can decide that the email message is "wanted" or "spam," and in some implementations, if the verification module 116 determines that the email message is spam, then it can discard the email message.

Figure 6:
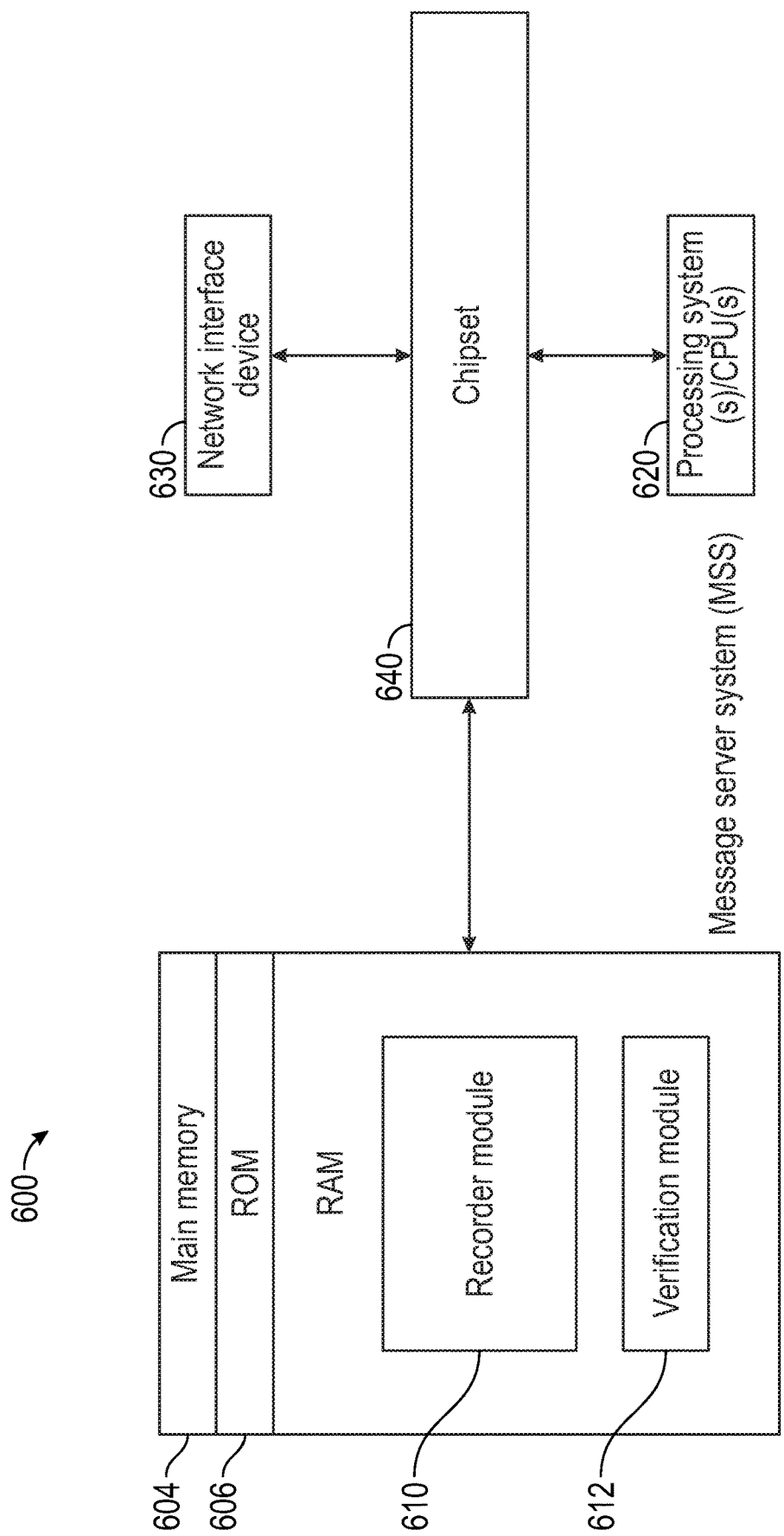
FIG. 6 is a schematic representation of an exemplary embodiment of message server suitable for use in a messaging system such as that depicted in FIG. 1.

FIG. 6 is a schematic representation of an exemplary embodiment of message server 600 suitable for use in a messaging system such as that depicted in FIG. 1. In practice, the message servers 104, 113 of FIG. 1 could be generally configured and implemented as shown in FIG. 6. Thus, the following general description of the server 600 may be applicable to either one of the message servers 104, 113 of FIG. 1.

The illustrated embodiment of the message server 600 includes, without limitation: a main memory 604, one or more processing system(s) 620, a network interface device (NID) 630, and a chipset 640. It will be appreciated that the message server 600 may not include all of the components shown in FIG. 6, may include other components that are not explicitly shown in FIG. 6, or may utilize an architecture completely different than that shown in FIG. 6. For example, the message server 600 may also include other input and output devices that are not illustrated in FIG. 6 for sake of simplicity.

The chipset 640 is usually located on a motherboard of the message server 600. The chipset 640 is a set of electronic components (e.g., in an integrated circuit) that interconnects and manages the data flow between the processing system(s) 620 and other elements of the message server 600. For instance, the chipset 640 provides an interface between the processing system(s) 620 and the main memory 604, and also includes functionality for providing network connectivity through the NID 630, such as a gigabit Ethernet adapter. The chipset 640 typically contains the processor bus interface (also known as a front-side bus), memory controllers, bus controllers, I/O controllers, etc.

The processing system(s) 620 communicates with main memory 604 and the NID 630 via chipset 640 and appropriate buses. Processing system(s) 620 represents one or more general-purpose processing devices such as a microprocessor, central processing unit, or the like. More particularly, the processing system(s) 620 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 620 may also be one or more special-purpose processing devices such as an application specific integrated circuit (ASIC), a field programmable gate array (FPGA), a digital signal processor (DSP), network processor, or the like.

The processing system(s) 620 can include one or more central processing units ("CPUs") that operate in conjunction with the chipset 640. The processing system(s) 620 perform arithmetic and logical operations necessary for the operation of the message server 600. The processing system(s) 620 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 630 is capable of connecting the message server 600 to other computers over the network 130. The network 130 can be an Ethernet or Gigabyte Ethernet LAN, a fiber ring, a fiber star, wireless, optical, satellite, a WAN, a MAN, or any other network technology, topology, protocol, or combination thereof. As such, the NID 630 allows the message server 600 to be connected (e.g., networked) to other machines in a LAN, an intranet, an extranet, or the Internet. In accordance with the disclosed embodiments, the message server 600 can receive messages from a user system and relay those messages to another user system (or to another message server in the path between that message server and the destination user system) via the NID 630. As described above, the message server 600 can also communicate with the database system 110 via the NID 630 to store one or more components of various messages it receives and can also generate queries to check the database system 110 for existence of stored components.

The chipset 640 can provide an interface to various forms of computer-readable storage media including a main memory 604 (e.g., read-only memory (ROM), flash memory, dynamic random access memory (DRAM) such as synchronous DRAM (SDRAM)), and storage devices (not illustrated). The processing system(s) 620 can communicate with the various forms for computer-readable storage media via the chipset 640 and appropriate buses.

The main memory 604 may be composed of many different types of memory components. The main memory 604 can include non-volatile memory (such as read-only memory (ROM) 606, flash memory, etc.), volatile memory (such as random access memory (RAM) 608), or some combination of the two. The RAM 608 can be any type of suitable random access memory including the various types of dynamic random access memory (DRAM) such as SDRAM, the various types of static RAM (SRAM). The main memory 604 (as well as the processing system(s) 620) may be distributed throughout the message server 600.

The RAM 608 includes programs/instructions 610, 612, and operating system software (not illustrated) that controls the operation of the message server 600 and manages computer hardware and software resources and provides common services for computer programs executed by the processing system(s) 620. Regardless of the implementation, the operating system includes many different "components" that make the different parts of the message server 600 work together.

The ROM of the main memory 604 can be used to store firmware that includes program code containing the basic routines that help to start up the message server 600 and to transfer information between elements within the message server 600. The ROM of the main memory 604 may also store other software components necessary for the operation of the message server 600 in accordance with the embodiments described herein.

The main memory 304 includes a computer-readable medium on which is stored one or more sets of instructions 610, 612. For example, in one embodiment, the RAM 608 stores instructions 610, 612 or executable code for one or more programs that can be loaded and executed at processing system(s) 620 to cause the processing system(s) 620 to perform various server functions that are described above with reference to FIGS. 2-5. These computer-executable instructions specify how the processing system(s) 620 transition between states to perform various acts described below with reference to FIGS. 2-5. For example, as explained above, the processing system(s) 620 of the message server 600 can access computer-readable storage media and execute computer-executable instructions 610 stored therein to cause the message server 600 to execute a recorder module 108 (as part of a sender process 106) to record selected component(s) from message in a block of a blockchain at the distributed database system 110. The processing system(s) 620 of the message server 600 can access computer-readable storage media and execute computer-executable instructions 612 stored therein to cause the message server 600 to execute a verification module 116 (as part of a recipient process) to determine whether selected component(s) of the received message match (or partially match) component(s) stored in a corresponding block at the distributed database system 110, and then mark the message as wanted or unwanted depending on the result of that matching analysis and any further processing performed by the verification module 116. Various functions performed by the processing system(s) 620 upon loading and executing the instructions 610, 612 are described above in greater detail with reference to FIGS. 2-5.

Figure 7:
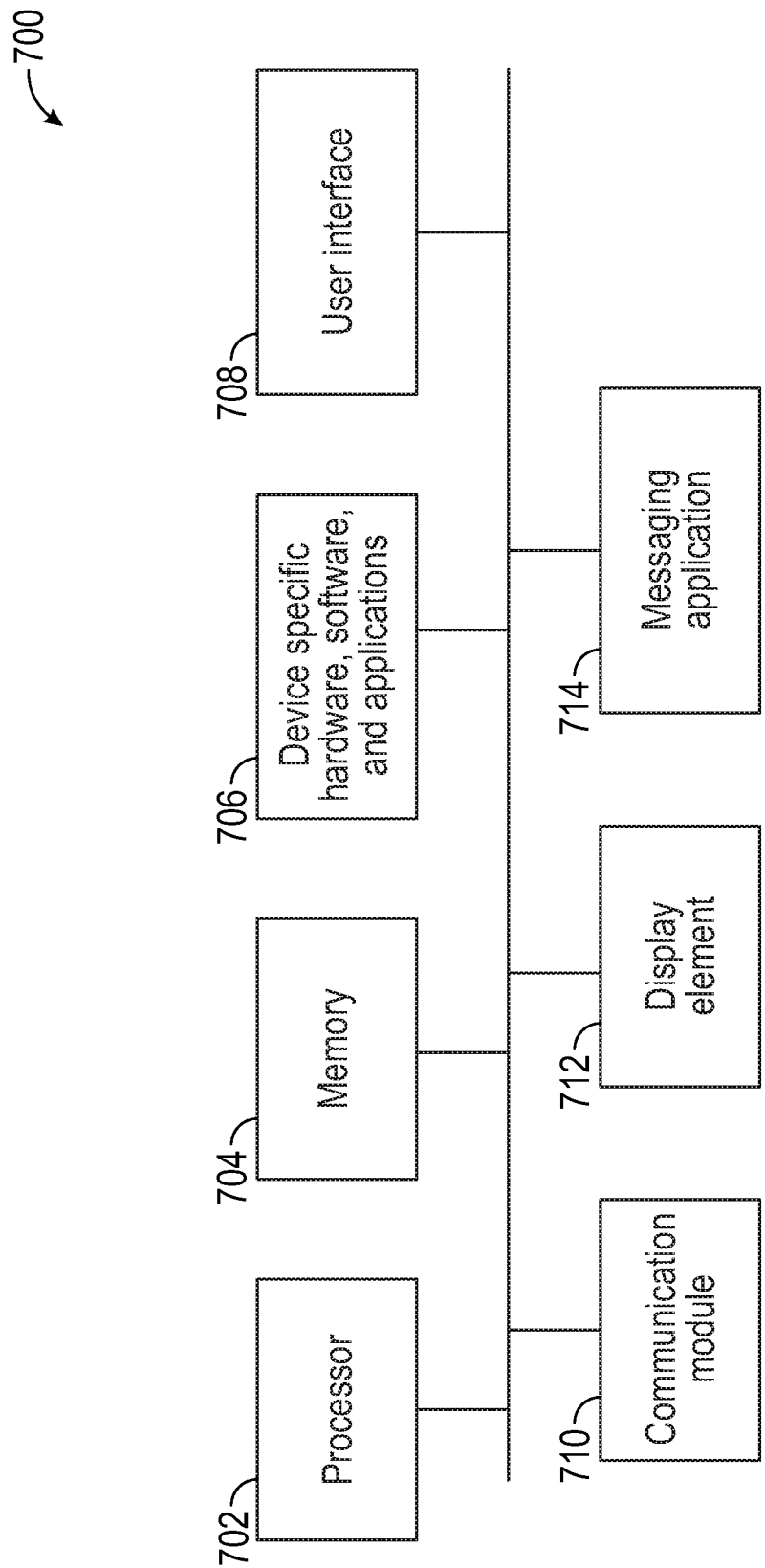
FIG. 7 is a schematic representation of an exemplary embodiment of user system suitable for use in a messaging system such as that depicted in FIG. 1.

FIG. 7 is a schematic representation of an exemplary embodiment of user system 700 suitable for use in a messaging system such as that depicted in FIG. 1. In practice, the user devices 102, 118 could be generally configured and implemented as shown in FIG. 7. Thus, the following general description of the device 700 may be applicable to either one of the user systems 102, 118 of FIG. 1.

The illustrated embodiment of the device 700 includes, without limitation: at least one processor 702; a suitable amount of memory 704; device-specific hardware, software, firmware, and/or applications 706; a user interface 708; a communication module 710; a display element 712; and a messaging application 714. Of course, the device 700 may include additional elements, components, modules, and functionality configured to support various features that are unrelated to the subject matter described here. For example, the device 700 may include certain features and elements to support conventional functions that might be related to the particular implementation and deployment of the device 700. In practice, the elements of the device 700 may be coupled together via a bus or any suitable interconnection architecture 718.

The processor 702 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 704 may be realized as RAM memory, flash memory, EPROM memory, EEPROM memory, registers, a hard disk, a removable disk, a CD-ROM, or any other form of storage medium known in the art. In this regard, the memory 704 can be coupled to the processor 702 such that the processor 702 can read information from, and write information to, the memory 704. In the alternative, the memory 704 may be integral to the processor 702. As an example, the processor 702 and the memory 704 may reside in an ASIC. The memory 704 can be used to store computer-readable media, where a tangible computer-readable medium has computer-executable instructions stored thereon. The computer-executable instructions, when read and executed by the device 700, cause the device 700 to perform certain tasks, operations, functions, and processes described in more detail herein. In this regard, the memory 704 may represent one suitable implementation of such computer-readable media. Alternatively or additionally, the device 700 could receive and cooperate with computer-readable media (not separately shown) that is realized as a portable or mobile component or platform, e.g., a portable hard drive, a USB flash drive, an optical disc, or the like.

The device-specific hardware, software, firmware, and applications 706 may vary from one embodiment of the device 700 to another. For example, the device-specific hardware, software, firmware, and applications 706 will support telephone functions and features when the device 700 is realized as a mobile telephone, conventional personal computer functions and features if the device 700 is realized as a desktop or portable computer. In practice, certain portions or aspects of the device-specific hardware, software, firmware, and applications 706 may be implemented in one or more of the other blocks depicted in FIG. 7.

The user interface 708 may include or cooperate with various features to allow a user to interact with the device 700. Accordingly, the user interface 708 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the device 700.

The communication module 710 facilitates data communication between the device 700 and other components as needed during the operation of the device 700. In the context of this description, the communication module 710 can be employed during a messaging session that includes the device 700 as one of the participant devices. An embodiment of the device 700 may support wireless data communication and/or wired data communication, using various data communication protocols. For example, the communication module could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module could support one or more wired/cabled data communication protocols, including, without limitation: Ethernet; home network communication protocols; USB; IEEE 1394 (Firewire); hospital network communication protocols; and proprietary data communication protocols.

The display element 712 is suitably configured to enable the device 700 to render and display various screens, graphical user interfaces (GUIs), drop down menus, auto-fill fields, text entry fields, message fields, or the like. Of course, the display element 712 may also be utilized for the display of other information during the operation of the device 700, as is well understood. Notably, the specific configuration, operating characteristics, size, resolution, and functionality of the display element 712 can vary depending upon the practical implementation of the device 700. For example, if the device 700 is a desktop computer, then the display element 712 may be a relatively large monitor. Alternatively, if the device 700 is a cellular telephone device, then the display element 712 may be a relatively small integrated display screen, which may be realized as a touch screen.

The messaging application 714 represents the hardware, software, firmware, and/or processing logic that supports the various messaging features and functions described herein that allow the user systems 102, 118 to send, receive and process messages. In certain non-limiting embodiments, the messaging application 714 can be a message could be an email message application, a SMS message application, a text message application, chat message application, voice message application, P2P message application, P2M message application, M2M message application, M2P message application, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, comprising:
    recording at least one selected component of a message that was received at a first message server into a block of a blockchain that is stored in a distributed database system that is distributed across a network of interconnected computer nodes;
    adding the selected component of the message to the blockchain after validation by other participants in the blockchain; and
    determining, at a second message server upon receiving the message, whether a component from the received message matches the selected component that is stored in the block of the blockchain.

2. The method of claim 1, further comprising:
    marking the message as wanted when the second message server determines that the component from the received message matches the selected component that is stored in the block of the blockchain.

3. The method of claim 1, after receiving the message at the first message server, further comprising:
    decomposing the message into components;
    generating reference information that is associated with the message, wherein the reference information indicates that the message is to be checked against the blockchain to verify the selected component of the message; and
    selecting the selected component of the message that is to be recorded into the block of the blockchain; and
    performing processing on the selected component prior to recording the selected component.

4. The method of claim 3, further comprising:
    adding information to the message that can be used by the second message server to identify the block in the blockchain where the selected component of the message is recorded;
    sending the message and the reference information from the first message server to the second message server in accordance with a standard messaging protocol; and
    receiving the message and the reference information at the second message server; after receiving the message at the second message server, further comprising:
    parsing the message into components at the second message server;
    extracting the information from the message that can be used by the second message server to identify the block in the blockchain where the selected component of the message is recorded;
    using the extracted information to access the block of the blockchain; and
    selecting a component of the received message for comparison to the selected component that is stored in the block of the blockchain.

5. The method of claim 1, when the second message server determines that the component from the received message does not match the selected component that is stored in the block of the blockchain, further comprising:
    determining, at the second message server, whether the component from the received message partially matches the selected component that is stored in the block of the blockchain; when the second message server determines that the component from the received message does not partially match the selected component that is stored in the block of the blockchain, further comprising:
    marking, at the second message server, the received message as unwanted; when the second message server determines that the component from the received message partially matches the selected component that is stored in the block of the blockchain, further comprising:

performing further processing, at the second message server, to determine whether the received message is wanted or unwanted.

6. The method of claim 1, wherein the blockchain comprises a chain of linked blocks in which transactions are recorded chronologically, and wherein each block in the chain of linked blocks stores a reference that links that block to a previous block and to each additional block in the chain.

7. The method of claim 1, wherein the block comprises a reference to a previous block in the blockchain, a timestamp and valid transaction data including the selected component of the message, wherein the selected component is recorded into the block chain to represent that the message was sent or received, and wherein the reference to the previous block in the blockchain is a cryptographic hash of the previous block in the blockchain that links the block to the previous block.

8. The method of claim 1, wherein the messaging system is a short message service (SMS) messaging system, and the message is a SMS message.

9. The method of claim 1, wherein the messaging system is a message posting feature of a social networking website, and the message is a social networking website message.

10. The method of claim 1, wherein the messaging system is Person-to-Person (P2P) messaging system, and the message is a P2P message.

11. The method of claim 1, wherein the messaging system is Machine-to-Person (M2P) messaging system, and the message is a M2P message.

12. A messaging system, comprising:
a first message server comprising one or more hardware-based processors and memory, the first message server being configured to receive a message from a first user system, and record a selected component of the received message into a block of a blockchain stored via a distributed database system that is distributed across a network of interconnected computer nodes; and
a second message server comprising one or more hardware-based processors and memory, the second message server being configured to determine, upon receiving the message, whether a component from the received message matches the selected component that is stored in the block of the blockchain.

13. The messaging system of claim 12, wherein the messaging system is a short message service (SMS) messaging system, and the message is a SMS message.

14. The messaging system of claim 12, wherein the messaging system is a message posting feature of a social networking website, and the message is a social networking website message.

15. The messaging system of claim 12, wherein the messaging system is Person-to-Person (P2P) messaging system, and the message is a P2P message.

16. The messaging system of claim 12, wherein the messaging system is Machine-to-Person (M2P) messaging system, and the message is a M2P message.

17. A server system comprising a processor and a memory, wherein the memory comprises computer-executable instructions that are capable of execution by the processor, and that when executed by the processor, cause the server system to:

decompose a message from a first user system into components;
select at least one component that is to be recorded into a block of a blockchain, wherein the blockchain is stored in a distributed database system;
record the selected component of the message into the block of the blockchain;
generate reference information that is associated with the message, wherein the reference information indicates that the message is to be checked against the blockchain to verify the selected component of the message;
add information to the message that can be used by a second message server to identify the block in the blockchain; and
send the message and the reference information to the second message server.

18. The server system of claim 17, wherein the server system is part of a short message service (SMS) messaging system, and the message is a SMS message.

19. The server system of claim 17, wherein the server system is part of a message posting feature of a social networking website, and the message is a social networking website message.

20. The server system of claim 17, wherein the server system is part of a Person-to-Person (P2P) messaging system, and the message is a P2P message.

21. The server system of claim 17, wherein the server system is part of a Machine-to-Person (M2P) messaging system, and the message is a M2P message.

22. A server system comprising a processor and a memory, wherein the memory comprises computer-executable instructions that are capable of execution by the processor, and that when executed by the processor, cause the server system to:
receive a message and reference information from a first message server, wherein the reference information indicates that the message is to be checked against a blockchain to verify a selected component of the message;
parse the message into components;
extract information from the message that can be used to identify a block in the blockchain, wherein the block is where a selected component of the message has been recorded;
access the block of the blockchain at the distributed database system using the extracted information;
determine whether the selected component from the received message matches a component that is stored in the block of the blockchain; and
mark the message as wanted when the selected component from the received message matches the component that is stored in the block of the blockchain.

23. The server system of claim 22, wherein the server system is part of a short message service (SMS) messaging system, and the message is a SMS message.

24. The server system of claim 22, wherein the server system is part of a message posting feature of a social networking website, and the message is a social networking website message.

25. The server system of claim 22, wherein the server system is part of a Person-to-Person (P2P) messaging system, and the message is a P2P message.

26. The server system of claim 22, wherein the server system is part of a Machine-to-Person (M2P) messaging system, and the message is a M2P message.

* * * * *